(12) United States Patent
Brown

(10) Patent No.: US 6,231,065 B1
(45) Date of Patent: May 15, 2001

(54) TRACTOR AND TRAILER

(75) Inventor: David John Bowes Brown, North Yorkshire (GB)

(73) Assignee: Multidrive Limited, North Yorkshire (GB)

( * ) Notice: Subject to any disclaimer, the term of this patent is extended or adjusted under 35 U.S.C. 154(b) by 0 days.

(21) Appl. No.: 09/269,135

(22) PCT Filed: Sep. 8, 1997

(86) PCT No.: PCT/GB97/02409

§ 371 Date: May 14, 1999

§ 102(e) Date: May 14, 1999

(87) PCT Pub. No.: WO98/10948

PCT Pub. Date: Mar. 19, 1998

(30) Foreign Application Priority Data

Sep. 12, 1996 (GB) .................................................. 9619099

(51) Int. Cl.[7] .................................................. B60D 00/00
(52) U.S. Cl. ............................................. 280/482; 180/7.1
(58) Field of Search .................................. 280/482, 483, 280/486; 180/7.1

(56) References Cited

U.S. PATENT DOCUMENTS

| | | | |
|---|---|---|---|
| 2,832,610 | * | 4/1958 | Le Tarte ................................ 180/7.1 |
| 3,244,434 | * | 4/1966 | Reed et al. . | |
| 3,578,096 | * | 5/1971 | Pearson ................................ 180/14.6 |
| 4,240,647 | * | 12/1980 | Lewis ................................... 280/482 |
| 4,611,821 | * | 9/1986 | Jeanson et al. ....................... 280/482 |

FOREIGN PATENT DOCUMENTS

| | | | |
|---|---|---|---|
| 295 589 | * | 6/1988 | (EP) . |
| 2 474 966 | * | 11/1979 | (FR) . |
| 2 646 812 | * | 5/1989 | (FR) . |
| 2 208 218 | * | 3/1989 | (GB) . |

* cited by examiner

*Primary Examiner*—Kevin Hurley
(74) *Attorney, Agent, or Firm*—Levisohn, Lerner, Berger & Langsam

(57) ABSTRACT

An extensible and retractable linear drive (5) connects a tractor unit (1) and a trailer unit (2) and is controlled by a control unit (11). The progress of the tractor/trailer combination is assisted by alternately forcibly increasing and forcibly decreasing the distance between tractor and trailer units (1, 2).

16 Claims, 2 Drawing Sheets

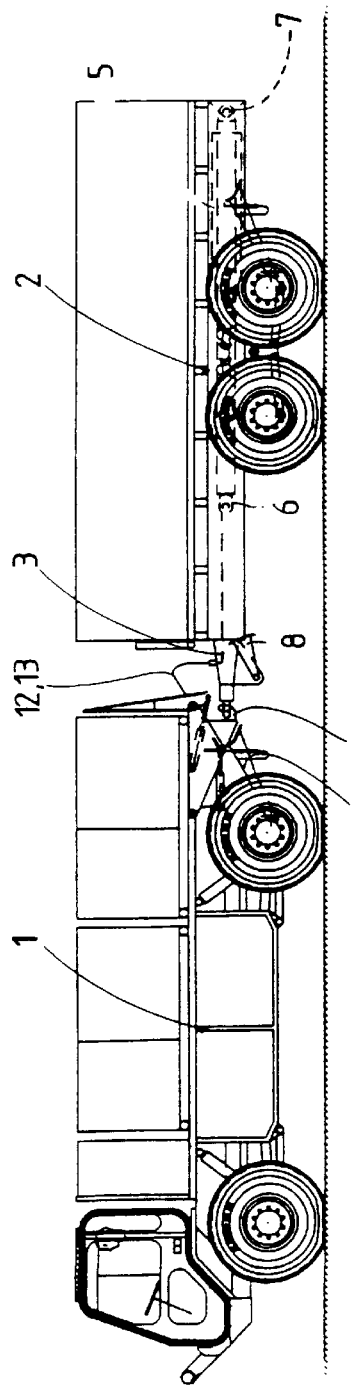
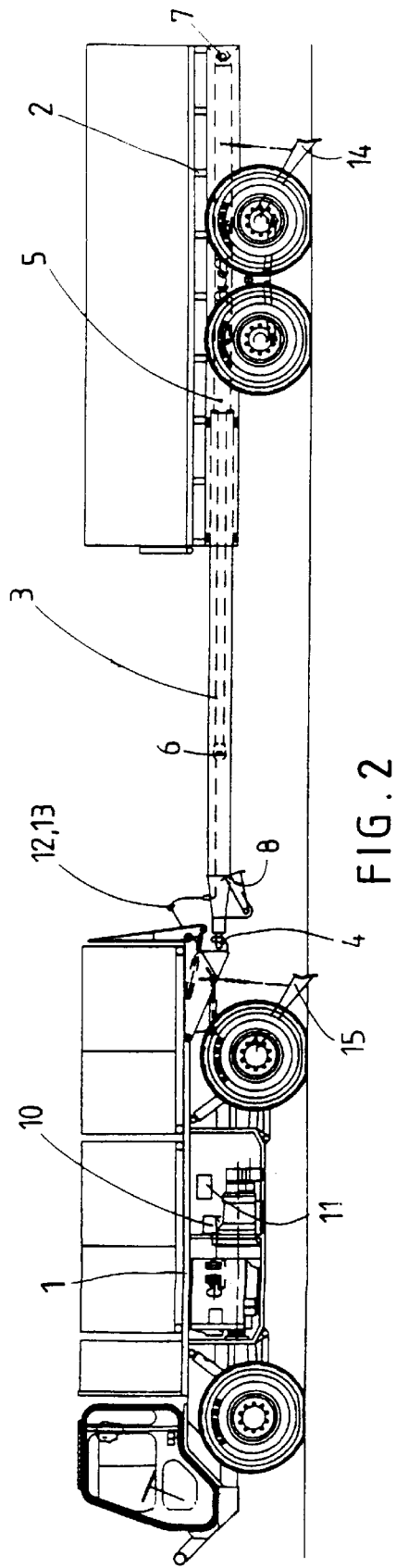

TRACTOR AND TRAILER

BACKGROUND OF THE INVENTION

This invention relates to a tractor/trailer combination comprising a tractor unit (e.g. a truck) and a trailer unit.

Coupling an undriven trailer to a truck or tractor causes an increase in the resistance to travel, without any compensation increase in tractive force. This can significantly reduce the ability of the tractor to traverse adverse grades or soft ground. It would therefore be desirable to be able to improve this ability by the addition of the trailer, rather than detracting from it.

The present invention provides a tractor/trailer combination comprising a tractor unit and a trailer unit, and continue means for automatically repeatedly forcibly increasing and forcibly decreasing the distance between the units in an alternating cycle at a predetermined frequency.

In one aspect the invention provides a tractor/trailer combination comprising a tractor unit, a trailer unit, and an extensible and retractable linear drive connecting the units, and control means for alternately extending and retracting the linear drive so as to alternately increase and decrease the distance between the units.

In another aspect the invention provides a method of assisting the progress of a tractor/trailer combination comprising a tractor unit and a trailer unit, the method comprising alternately forcibly increasing and forcibly decreasing the distance between the units.

The inventor has found that increasing and decreasing the distance between a tractor unit and a trailer unit in a series of pulses can have the advantageous effect that motion in the direction of travel (forward or reverse) is maintained, where it might otherwise be halted owing to the terrain. Alternatively, it is possible to increase the stroke length and move step-wise, the tractor unit and the trailer unit being stationary alternately.

The invention will be described further, by way of example, with reference to the accompanying drawings,:

BRIEF DESCRIPTION OF THE DRAWINGS

FIG. 1 is a side view of a tractor/trailer combination, with a linear drive fully retracted;

FIG. 2 is a side view of the combination, with the linear drive fully extended;

DETAILED DESCRIPTION OF PREFERRED EMBODIMENT

Figure 3:
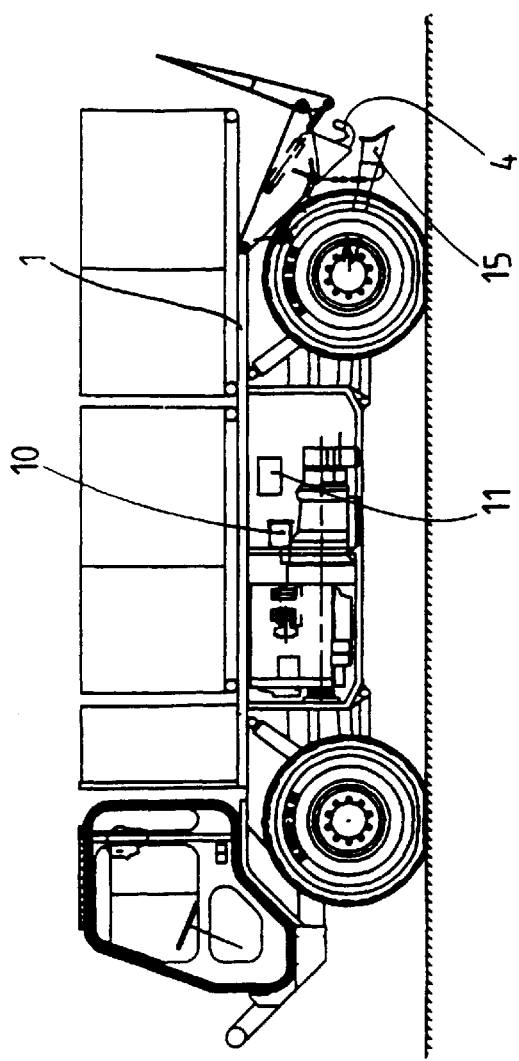
FIG. 3 is a side view of the tractor unit separated from the trailer unit.

The tractor/trailer combination illustrated comprises a tractor unit (truck) 1 with all-wheel drive from an internal combustion engine, and a trailer unit (trailer) 2 with an extensible drawbar 3 which is coupled to a variable-height hook 4 (pivotally mounted on the rear of the frame of the truck 1).

The drawbar 3 is extended and retracted by means of a linear drive in the form of a hydraulic double-acting piston-and-cylinder device 5 pin-jointed to the drawbar 3 at its rod end 6 and to the frame of the trailer 2 at its cylinder end 7. A control unit 11 including a valve controls delivery of hydraulic oil from an engine-driven hydraulic pump 10. From the control unit 11 the hydraulic fluid is delivered to the piston-and-cylinder device 5 through two flexible hydraulic pipes 12,13.

The control unit 11 is operated from the driver's cab of the truck 1. The driver selects the amplitude of the drawbar extension-retraction cycle, typically within a range from 50 mm to 4000 mm, and the control unit 11 automatically controls the flow through the pipes 12,13 accordingly. The frequency of the cycle will normally depend on the amplitude, since extension and retraction of the hydraulic piston-and-cylinder device proceed at substantially constant speeds, extension normally being slower than retraction.

In conditions where the truck provides (or appears likely to provide) insufficient tractive force to propel the tractor/trailer combination, the driver selects a pulsing short stroke. For example, assuming that it takes 12 seconds to extend the drawbar 3 by 4000 mm and 8 seconds to retract the drawbar, if the stroke length (amplitude) is selected to be 50 mm, the frequency of pulsing will be about 4 cycles per second. If the stroke length is 200 mm, the frequency is about 1 cycle per second. At such frequencies, the push-pull effect will be virtually indistinguishable from the background vibrations of the truck due to the terrain.

The trailer 2 momentarily pushes the truck 1 and is then pulled by the truck 1, which slows down but does not stop. The trailer brakes are automatically applied during the extension phase, using the hydraulic pressure exerted in extending the linear drive device 5, under control of the control unit 11. Similarly, the truck brakes may optionally be applied during the retraction phase. Braking of the truck 1 is usually only required if a long stroke (e.g. more than one meter) has to be selected and the truck is unable to proceed without assistance from the trailer. To further extend the tractive capability, in extremely low coefficient of adhesion ground conditions, a ground anchor 14 on the trailer 2 and a ground anchor 15 on the truck 1 (each comprising a pivotally-mounted rearwardly directed strut or struts) can be lowered to resist backward motion. Each anchor 14,15 drags over the ground during the forward motion. In these conditions, using the maximum stroke length of e.g. 4 m, with an extension time of 12 s and a retraction time of 8 s, it is possible to progress at a speed of at least 12 m/min.

Although the above description is directed to forward travel, it will be apparent that the tractor/trailer combination can be driven in reverse, with appropriate arrangement of ground anchors and truck or trailer braking if required.

Figure 4:
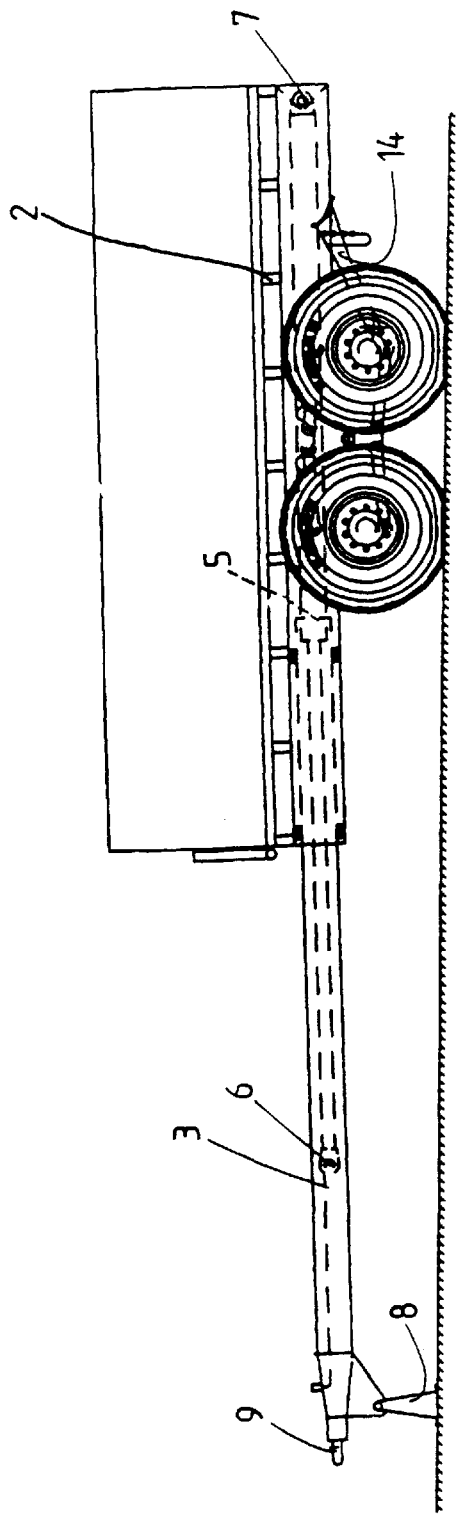
FIG. 4 is a side view of the trailer unit separated from the tractor unit.

To detach the trailer 2, the drawbar 3 is extended (FIG. 4) and a support 8 pivotably mounted on it is lowered. The hook 4 on the truck 1 is then lowered until it disengages from an eye 9 at the end of the drawbar 3 (FIG. 3).

Thus, as described above, a tractor and undriven trailer are provided in a combination in which the distance between the tractor and trailer wheels is alternately increased and decreased forcibly, by a hydraulically extendible drawbar, alternately increasing and decreasing the tractive requirement of the tractor in such a way that forward (or rearward) motion is maintained, where it might otherwise be halted. A long-stroke feature is also provided, which alternately stops the tractor and the trailer, for even worse tractive conditions, assisted where necessary by land anchors.

What is claimed is:

1. A tractor/trailer combination comprising
   a tractor unit and a trailer unit having a distance therebetween,
   drive means for forcibly increasing and forcibly decreasing the distance between the units, and
   control means for controlling the drive means so that the distance between the units is automatically repeatedly forcibly increased and forcibly decreased in an alternating cycle at a predetermined frequency.

2. A combination as claimed in claim 1, in which the drive means comprises an extensible and retractable linear drive connecting the units.

3. A combination as claimed in claim 2, in which the linear drive comprises a piston-and-cylinder device.

4. A combination as claimed in claim 2, in which the linear drive is mounted on one of the units and is connected to the other of the units.

5. A combination as claimed in claim 4, in which said one unit is the trailer unit.

6. A combination as claimed in claim 4, in which said one unit includes a drawbar connected to said other unit, the linear drive acting on the drawbar to extend and retract it.

7. A combination as claimed in claim 1, in which the units have land anchors deployable to resist movement of the units in a direction opposite to the direction of travel.

8. A method of assisting the progress of a tractor/trailer combination comprising a tractor unit and a trailer unit having a distance therebetween, the method comprising the step of automatically repeatedly forcibly increasing and forcibly decreasing the distance between the units in an alternating cycle at a predetermined frequency.

9. A method as claimed in claim 8, including braking the rear unit, with respect to the direction of travel, while the distance between the units is forcibly increased.

10. A method as claimed in claim 8, including braking the front unit, with respect to the direction of travel, while the distance between the units is forcibly decreased.

11. A method as claimed in claim 8, including anchoring the units so as to resist movement in a direction opposite to the direction of travel.

12. A method as claimed in claim 8, in which the cycle of increasing and decreasing distance between the units has a small amplitude relative to the length of each unit.

13. A method as claimed in claim 12, in which the said cycle has a frequency of at least about one cycle per second.

14. A method as claimed in claim 8, in which the cycle of increasing and decreasing distance between the units has an amplitude of more than one meter.

15. A method as in claim 8 wherein the distance is increased at a substantially constant speed regardless of amplitude, and the distance is decreased at a substantially constant speed regardless of amplitude, whereby the frequency is inversely proportional to the amplitude.

16. A method as in claim 15 wherein the amplitude is selected by a driver of the truck, whereby said frequency is predetermined.

* * * * *